US012486898B2

(12) United States Patent
McLaughlin et al.

(10) Patent No.: US 12,486,898 B2
(45) Date of Patent: Dec. 2, 2025

(54) COLLAPSIBLE GASKET

(71) Applicant: Honeywell Federal Manufacturing & Technologies, LLC, Kansas City, MO (US)

(72) Inventors: Jacob Ryan McLaughlin, Leawood, KS (US); Jackson Dale White, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/646,975

(22) Filed: Apr. 26, 2024

(65) Prior Publication Data
US 2025/0334179 A1    Oct. 30, 2025

(51) Int. Cl.
*F16J 15/02* (2006.01)
(52) U.S. Cl.
CPC .................................. *F16J 15/028* (2013.01)
(58) Field of Classification Search
CPC .... F16J 15/0818; F16J 15/0825; F16J 15/028; F16J 15/46
See application file for complete search history.

(56) References Cited

U.S. PATENT DOCUMENTS

| | | | | |
|---|---|---|---|---|
| 5,082,298 A | * | 1/1992 | Uchida | F16J 15/0825 |
| | | | | 277/595 |
| 5,137,283 A | * | 8/1992 | Giarrusso | F16J 15/02 |
| | | | | 277/944 |
| 5,408,963 A | * | 4/1995 | Miyaoh | F16J 15/0825 |
| | | | | 123/193.3 |
| 5,460,387 A | * | 10/1995 | Miyaoh | F02F 11/002 |
| | | | | 277/601 |
| 6,626,439 B1 | * | 9/2003 | Forry | F16J 15/123 |
| | | | | 277/592 |
| 10,578,092 B2 | * | 3/2020 | Overson | A61M 1/155 |
| 11,034,131 B2 | * | 6/2021 | Duoss | B32B 5/26 |
| 2017/0268495 A1 | * | 9/2017 | Overson | F04B 43/028 |
| 2019/0128607 A1 | | 5/2019 | Storrer et al. | |
| 2020/0263677 A1 | * | 8/2020 | Overson | A61M 1/159 |

FOREIGN PATENT DOCUMENTS

JP          4724562          7/2011

* cited by examiner

*Primary Examiner* — Christine M Mills
*Assistant Examiner* — L. Susmitha Koneru
(74) *Attorney, Agent, or Firm* — Hovey Williams LLP (57) ABSTRACT

A collapsible gasket comprises a bottom layer, at least one intermediate layer, and a top layer. The bottom layer is substantially solid and gas tight. The intermediate layer is positioned on the bottom layer and formed to include a plurality of segments and a plurality of channels. The top layer is positioned on the at least one intermediate layer and is substantially solid and gas tight, with a boundary of a gas tight internal chamber formed by the bottom layer, the top layer, and a seal between the bottom layer and the top layer.

13 Claims, 12 Drawing Sheets

COLLAPSIBLE GASKET

FEDERALLY SPONSORED RESEARCH AND DEVELOPMENT

This invention was made with Government support under Contract No.: DE-NA0002839 awarded by the United States Department of Energy/National Nuclear Security Administration. The Government has certain rights in the invention.

FIELD OF THE INVENTION

Embodiments of the current invention relate to gaskets that are collapsible in order to be inserted into a tight space.

BACKGROUND OF THE INVENTION

Gaskets are often used to fill and/or seal gaps between two or more spaced apart surfaces. A gasket may provide a sealing function to prevent fluid flow within the gap or may provide mechanical dampening or cushioning. Typically, a thickness of the gasket is slightly greater than a width of the gap. Problems arise when the thickness of the gasket is significantly greater than the width of the gap-particularly with very narrow gaps. Excessive force may be required to insert the gasket into the gap. The force may damage the gasket or the surfaces that form the gap. Even with the application of high force, the gasket may not be fully positioned within the gap.

The background discussion is intended to provide information related to the present invention which is not necessarily prior art.

SUMMARY OF THE INVENTION

Embodiments of the current invention address one or more of the above-mentioned problems and provide a gasket formed from elastic material that is configured to receive a vacuum and collapse when vacuum is applied to reduce its height so that the gasket can more easily be placed in a narrow gap. One embodiment of the collapsible gasket broadly comprises a bottom layer, at least one intermediate layer, and a top layer. The bottom layer is substantially solid and gas tight. The intermediate layer is positioned on the bottom layer and formed to include a plurality of segments and a plurality of channels. The top layer is positioned on the at least one intermediate layer and is substantially solid and gas tight, with a boundary of a gas tight internal chamber formed by the bottom layer, the top layer, and a seal between the bottom layer and the top layer.

Another embodiment of the current invention provides a collapsible gasket comprising a bottom layer, at least one intermediate layer, a top layer, and a vacuum port. The bottom layer is substantially solid and gas tight and formed from elastic material. The intermediate layer is positioned on the bottom layer and formed from elastic material to include a plurality of segments and a plurality of channels, with each channel being positioned between two or more segments and configured to allow air flow through the at least one intermediate layer. The top layer is positioned on the at least one intermediate layer and formed from elastic material to be solid and gas tight, with a boundary of a gas tight internal chamber formed by the bottom layer, the top layer, and a seal between the bottom layer and the top layer. The vacuum port is positioned in the bottom layer, the top layer, or the seal between the bottom layer and the top layer and configured to allow air to flow from the internal chamber to the exterior of the gasket and vice versa, wherein the collapsible gasket is configured to reduce in height when a vacuum is applied to the vacuum port Yet another embodiment of the current invention provides a method of forming a collapsible gasket, with the method comprising: forming a bottom layer of the gasket to be solid and gas tight; forming at least one intermediate layer to include a plurality of segments and a plurality of channels; forming a top layer of the gasket to be solid and gas tight; forming a seal between the bottom layer and the top layer; and forming a vacuum port in the bottom layer, the top layer, or the seal between the bottom layer and the top layer.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 2:
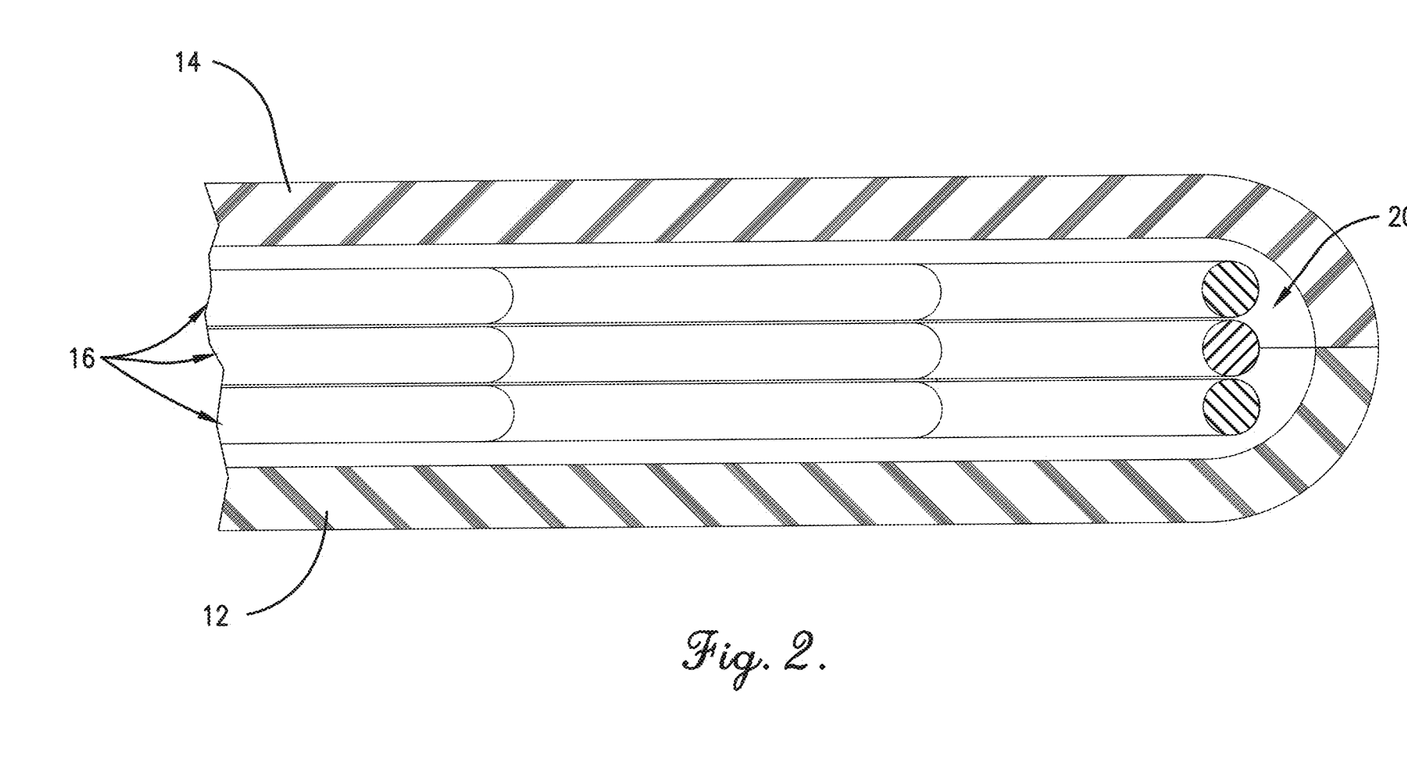
FIG. 2 is a cross-sectional view of the gasket cut along a vertical plane, the gasket including the bottom layer, a plurality of intermediate layers, and the top layer.
Figure 3:
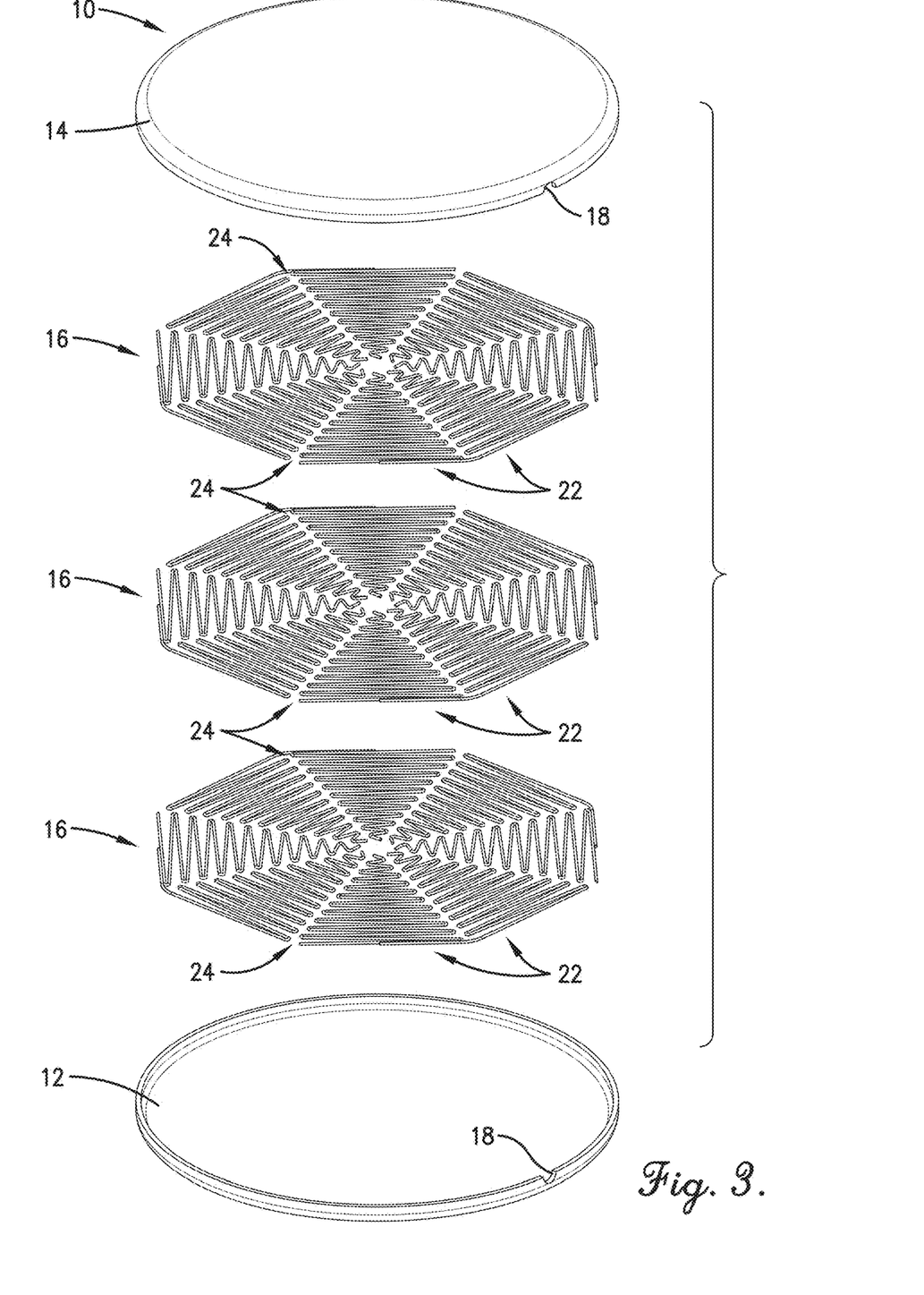
FIG. 3 is an upper perspective exploded view of the gasket, showing the bottom layer, three intermediate layers, and the top layer.
Figure 4:
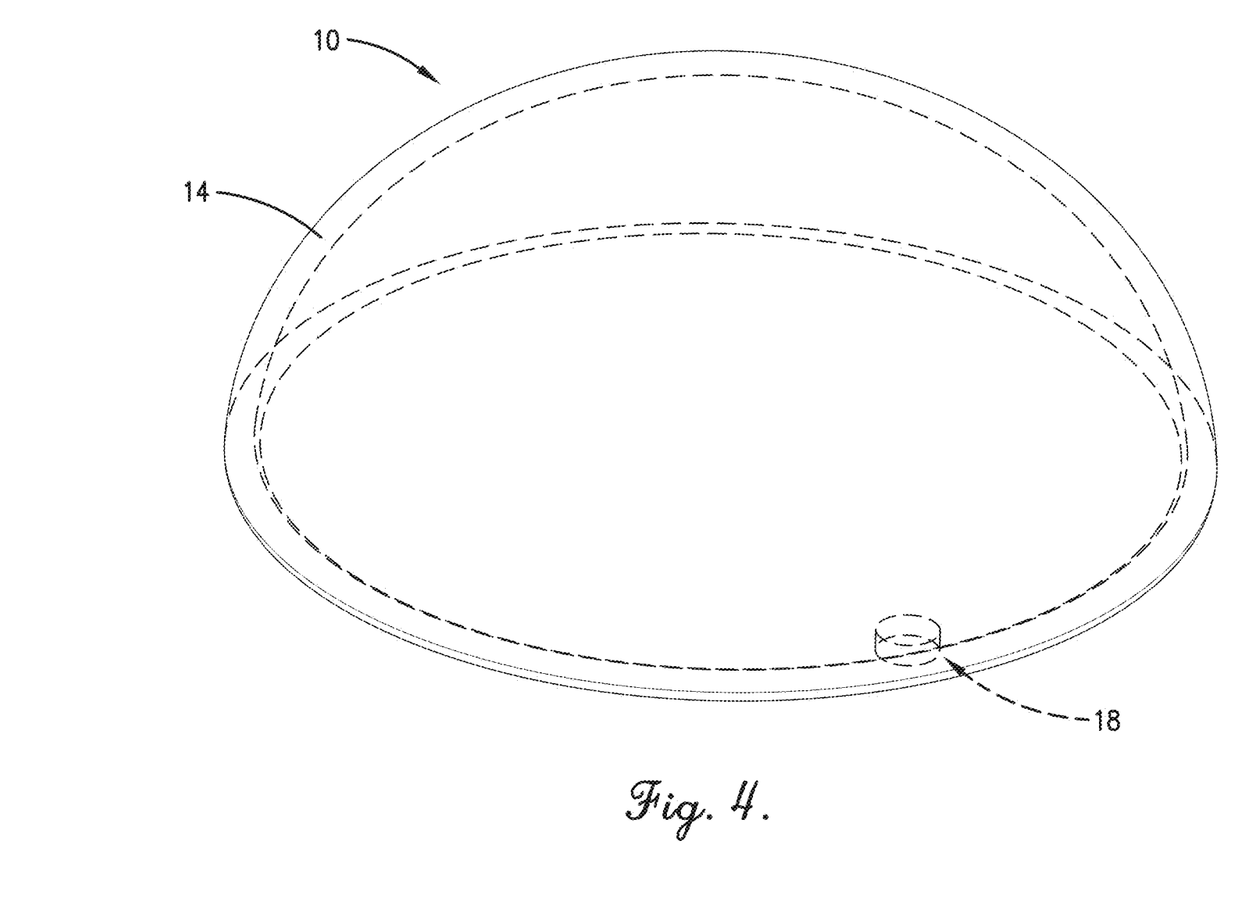
FIG. 4 is an upper perspective view of the gasket having an alternative shape.

A collapsible gasket 10, constructed in accordance with various embodiments of the current invention, is shown in FIGS. 1-4. The gasket 10 is utilized to fill a gap between two or more spaced apart surfaces, wherein the gap is very narrow-on the order of a few millimeters or less. The gasket 10 comprises multiple layers of material positioned one on top of another. The material of the layers of the gasket 10 includes elastomers or other polymers, silicone, or other elastic materials that can be utilized in a direct ink write (DIW) process. The layers may also material be formed from materials that are not necessarily elastic, but are flexible and able to be shaped or formed. The layers include a bottom layer 12, a top layer 14, at least one intermediate layer 16, and at least one vacuum port 18. The bottom layer 12 is a solid, continuous, gas tight layer that may be flat or non-planar with one or more contours or arcuate shapes. The top layer 14 may be the same or substantially similar to the bottom layer 12, or the top layer 14 may have a different shape. In various embodiments, the top layer 14 and the bottom layer 12 may each have a molded shape, such as a hemispheric shape as shown in FIG. 4. In addition, the top layer 14 is connected to the bottom layer 12 along a perimeter or circumference of the two layers 12, 14 to form a gas tight seal and create an internal chamber 20 bounded by inner surfaces of the top layer 14 and the bottom layer 12.

Figure 1A:
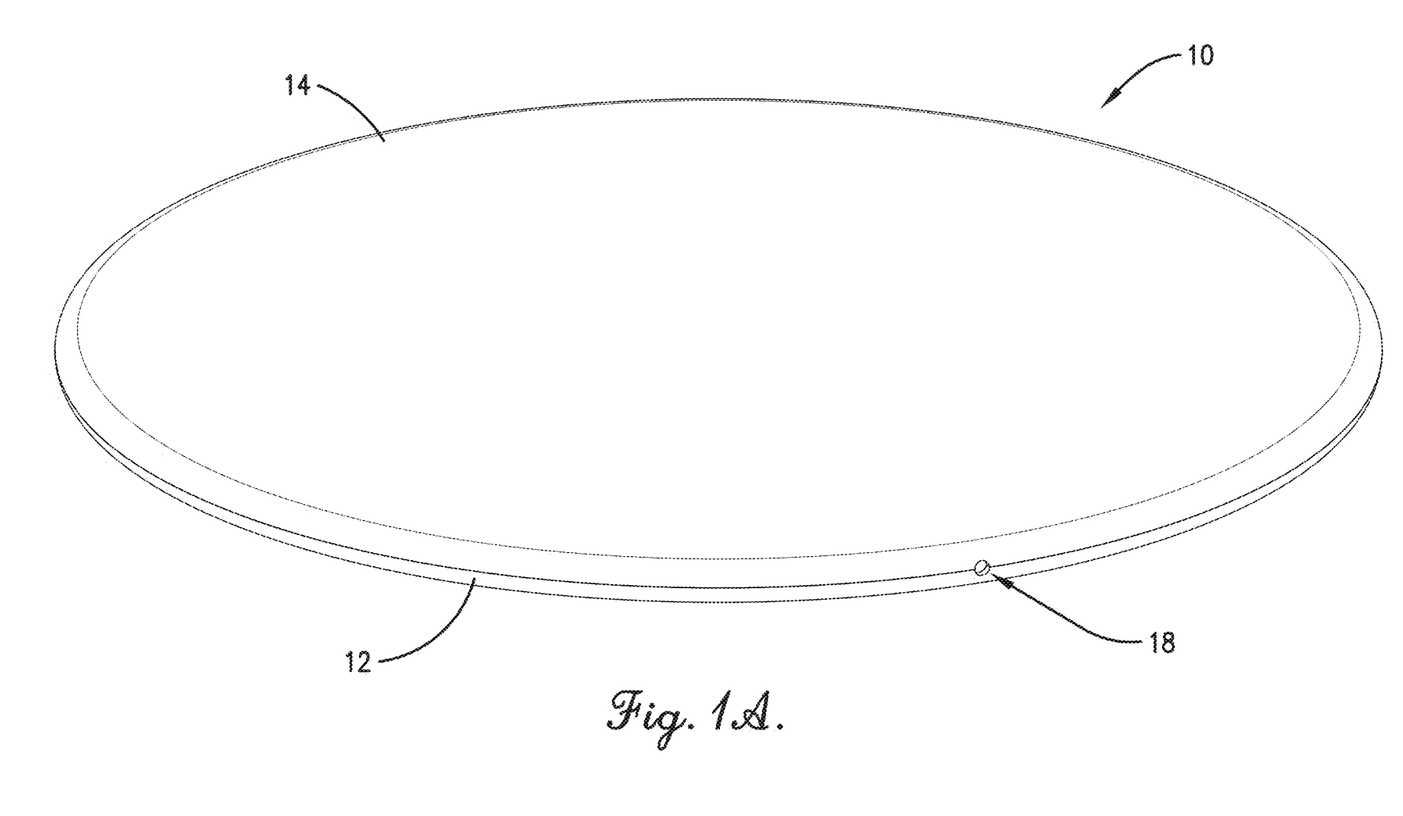
FIG. 1A is an upper perspective view of a collapsible gasket, constructed in accordance with various embodiments of the current invention, the gasket including a vacuum port positioned in a seal between a bottom layer and a top layer.
Figure 1B:
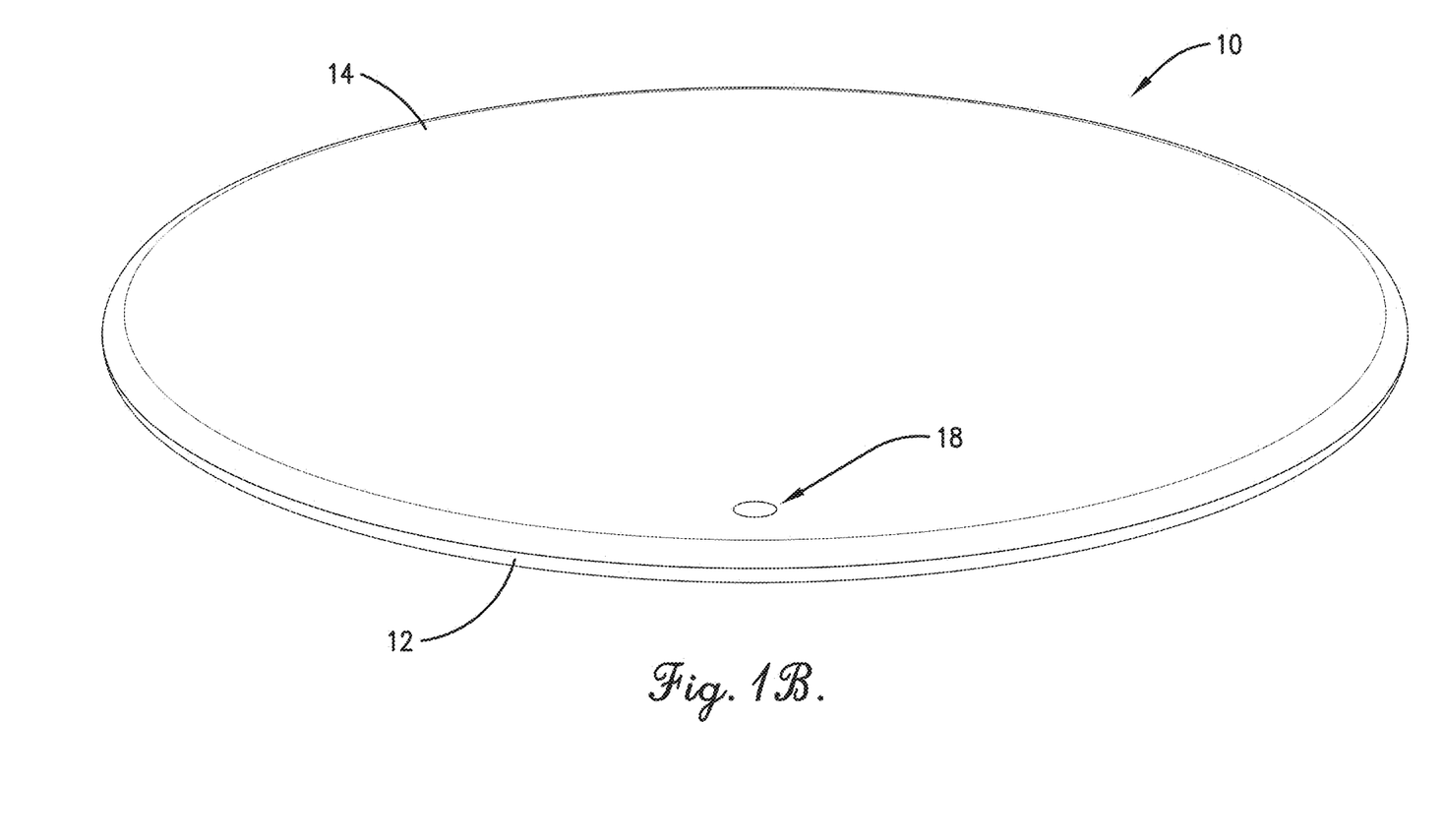
FIG. 1B is an upper perspective view of the gasket, wherein the vacuum port is positioned in the top layer.
Figure 1C:
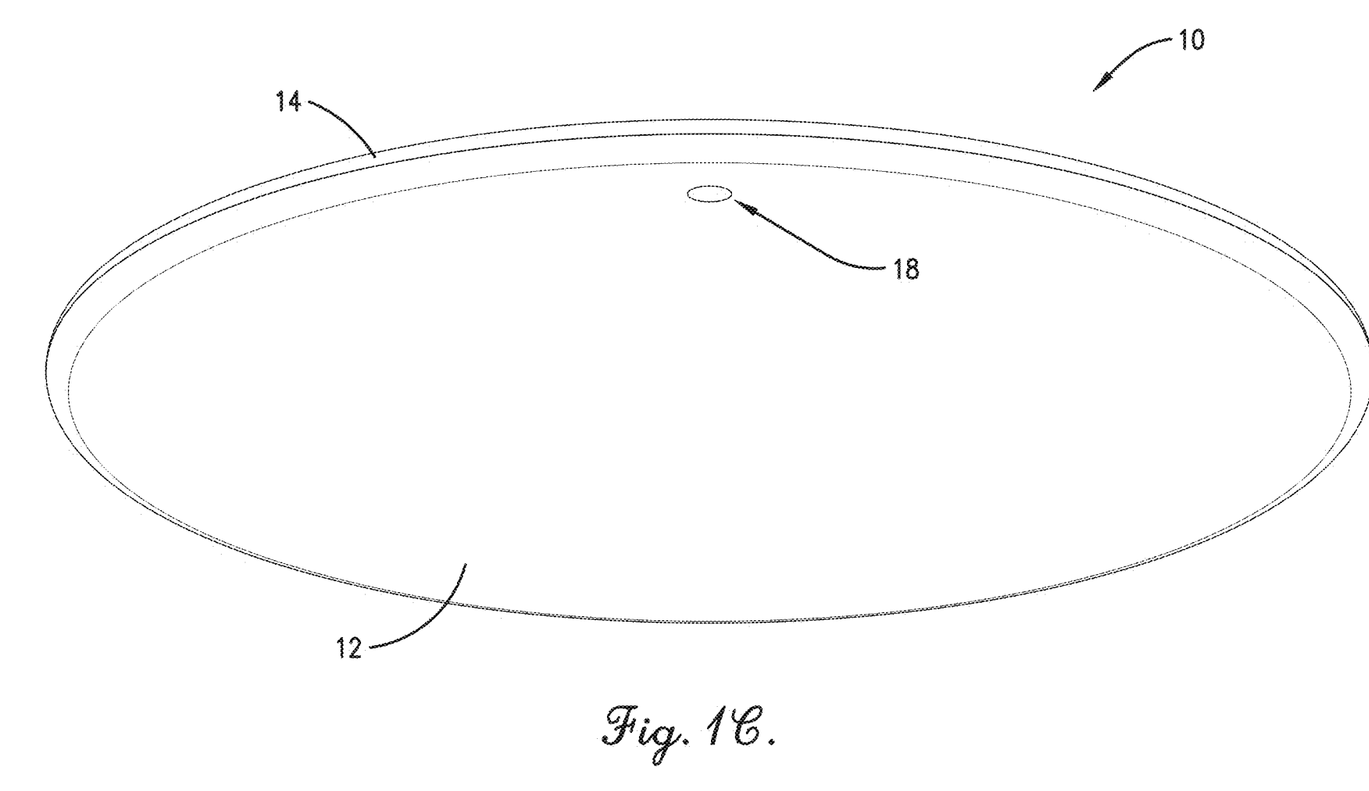
FIG. 1C is a lower perspective view of the gasket, wherein the vacuum port is positioned in the bottom layer.

Referring to FIGS. 2 and 3, there are three (3) intermediate layers 16. It is within the scope of the current invention to include a smaller number or a greater number of intermediate layers 16. Each intermediate layer 16 includes a plurality of material segments 22 and a plurality of channels 24. At least a portion of which are spaced apart and some of the segments 22 may be connected to one another. The channels 24 are positioned between the segments 22 and allow for fluid, such as a gas, a liquid, a gel, or the like, to flow through the intermediate layers 16 when the gasket 10 is being collapsed. In exemplary embodiments, each intermediate layer 16 includes a first portion of segments 22 that are formed like radial spokes which connect at a center point and a second portion of segments 22 that are formed like webbing or ribs in a decaying sinusoid pattern which connect to the spokes. The channels 24 are positioned between the spoke segments 22 and the web segments 22. The vacuum port 18 includes an opening from the exterior of the gasket 10 to the internal chamber 20. Referring to FIG. 1A, the opening is positioned at the connection of, joint between, or seal between, the bottom layer 12 and the top layer 14 in order for vacuum to be applied and held while the gasket 10 is being placed in the gap. Referring to FIG. 1B, the vacuum port 18 may alternatively be positioned in the top layer 14. Referring to FIG. 1C, the vacuum port 18 may alternatively be positioned in the bottom layer 12. The vacuum port 18 is configured to allow gas to pass from the internal chamber 20 to the exterior of the gasket 10 and fluid to pass from the exterior of the gasket.

The structure of the intermediate layers 16, i.e., the geometry or patterning of the segments 22 and the channels 24, varies according to, or is determined by, a sequence of collapse of the gasket 10 when a vacuum is applied to the gasket 10. Typically, the channels 24 are located and/or oriented to allow the collapse to occur in a particular sequence. For example, if an initial collapse is preferred to occur at a center of the gasket 10 followed by collapse at the edges, then one or more channels 24 may extend from the vacuum port 18 to the center of the gasket 10 and from the center of the gasket 10 outward to the edges.

Figure 5A:
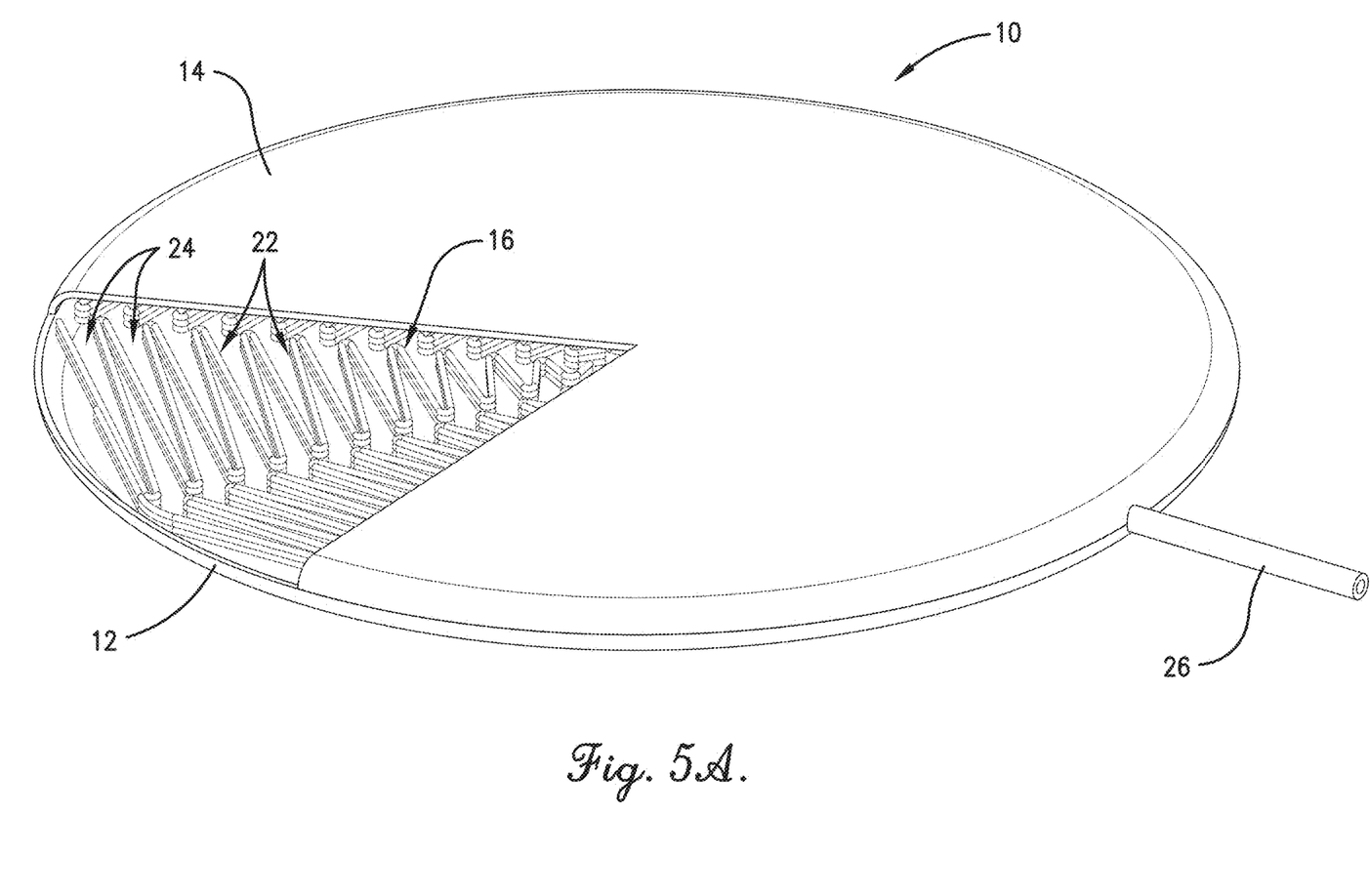
FIG. 5A is an upper perspective view of the gasket with a vacuum line attached to a vacuum port on the gasket.
Figure 5B:
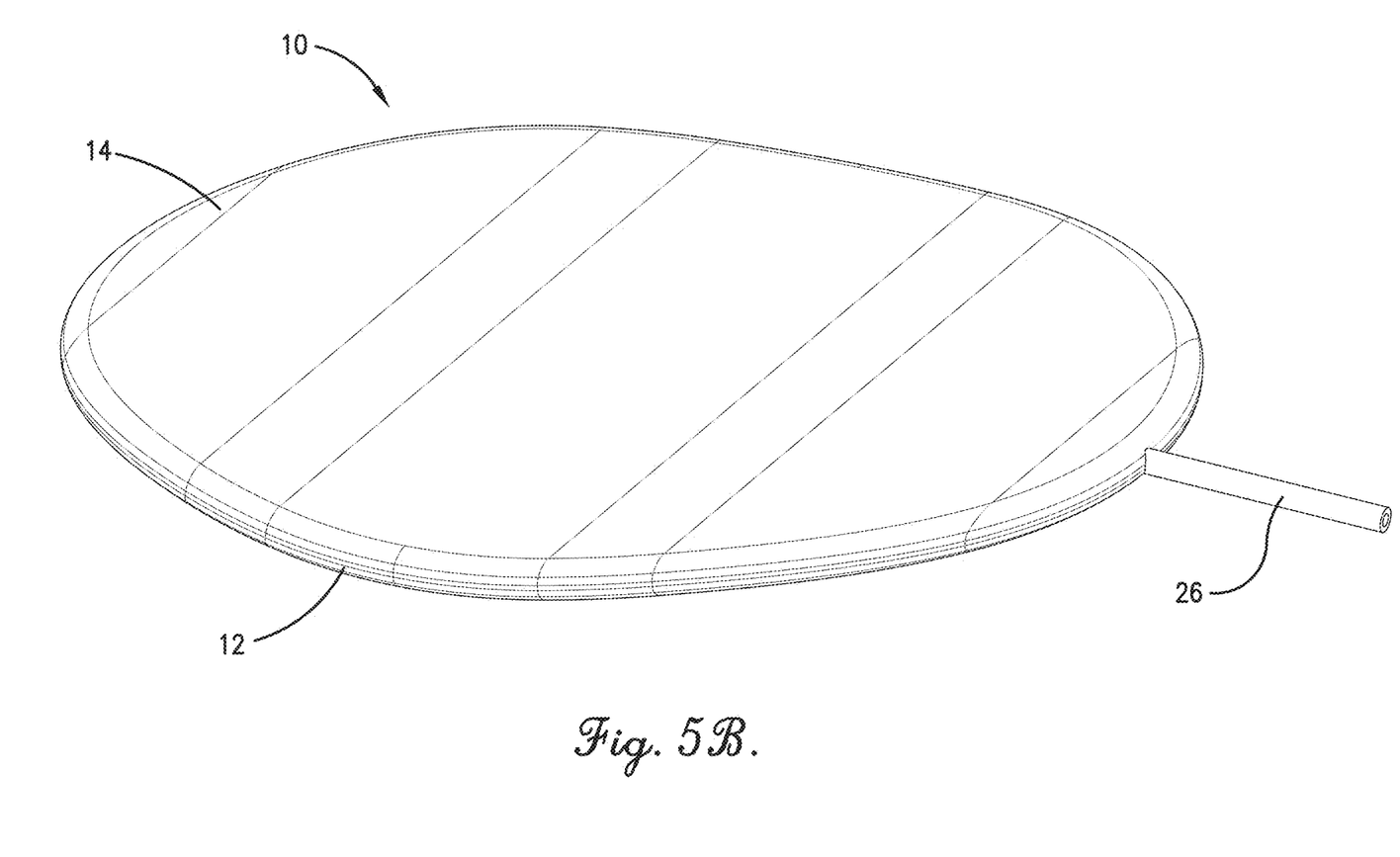
FIG. 5B is an upper perspective view of the gasket with the vacuum line attached to the vacuum port and a vacuum being applied.
Figure 6A:
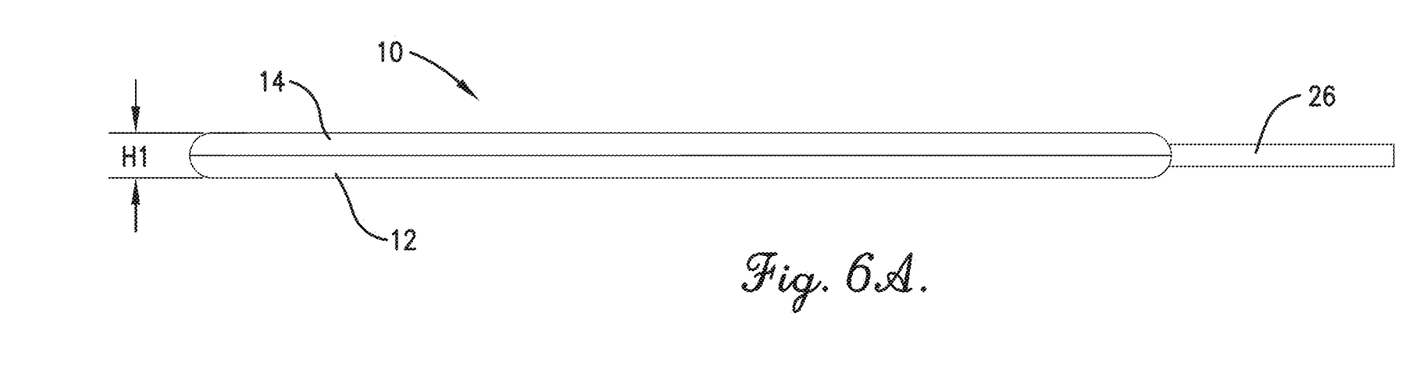
FIG. 6A is a side view of the gasket with the vacuum line attached to the vacuum port on the gasket.
Figure 6B:
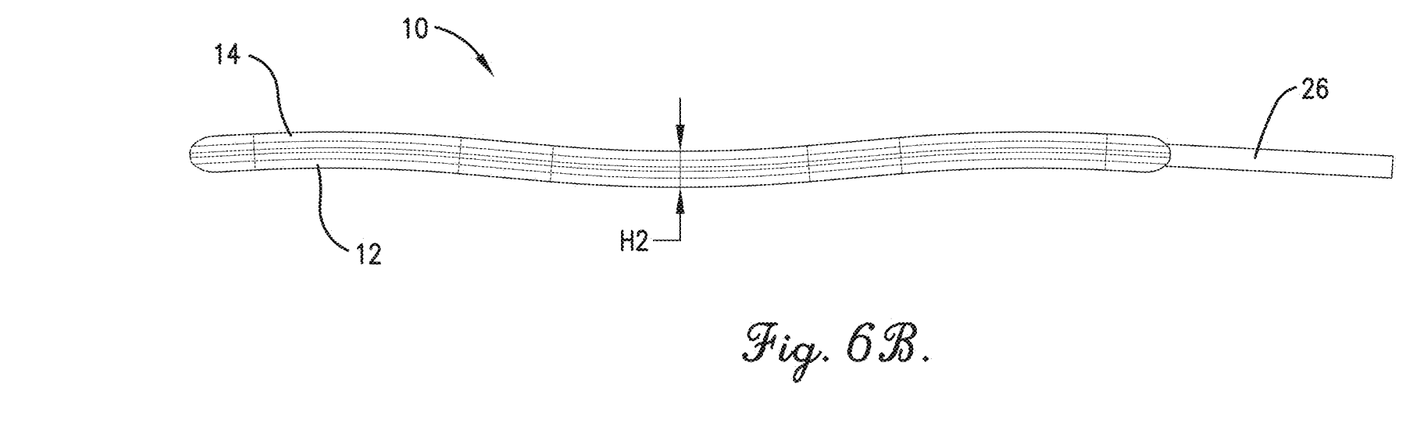
FIG. 6B is a side view of the gasket with the vacuum line attached to the vacuum port and a vacuum being applied.

The gasket 10 may be utilized as follows. Referring to FIGS. 5A and 6A, a line 26 is attached to the vacuum port 18. The line 26 is attached to a vacuum (negative pressure) source. At this point, the gasket 10 has a first height H1. Referring to FIGS. 5B and 6B, vacuum is applied through the line 26. Gas within the internal chamber 20 flows through the channels 24 and out of the gasket 10 such that a height of the gasket 10 reduces—that is, the gasket 10 collapses and has a height H2, which is less than H1. While the vacuum is still applied, the gasket 10 is placed in the gap, generally such that at least a portion of the bottom layer 12 is in contact with at least a portion of one of the surfaces of the gap and at least a portion of the top layer 14 is in contact with at least a portion of another surface of the gap. The vacuum is no longer applied. In some embodiments, the line 26 is removed. The gasket 10 may expand, if possible. The vacuum port 18 may be sealed or may be left open. In other embodiments, after the vacuum is no longer applied, the gasket 10 may be injected or filled with a fluid, such as a gas, a liquid, a gel, or the like, through the line 26. The gasket 10 may be injected or filled using a positive pressure, ambient pressure, or less than ambient pressure. When the fluid has been injected or filled, the vacuum port 18 is sealed.

Referring to FIGS. 7A, 7B, 7C, and 8, another embodiment of the gasket 100 is shown. The gasket 100 broadly comprises a bottom layer 112, a top layer 114, at least one intermediate layer 116, at least one vacuum port 118, an internal chamber 120, a plurality of material segments 122, a plurality of channels 124, and a perimeter ring 126. The bottom layer 112, the top layer 114, the intermediate layer(s) 116, the vacuum port 118, the internal chamber 120, the material segments 122, and the channels 124 are each the same as, or substantially similar to the like-named components described above. The ring 126 is formed from the same material as the bottom layer 112, the top layer 114, and the intermediate layer(s) 116. The ring 126 surrounds the intermediate layer(s) 116 and has a shape that conforms to a circumference, perimeter, or edges of the bottom layer 112 and the top layer 114. For example, if the bottom layer 112 and the top layer 114 each have a circular or disc shape (as with exemplary embodiments shown in the figures), then the ring 126 has a hollow cylindrical shape. If the bottom layer 112 and the top layer 114 each have a rectangular or square shape, then the ring 126 has a shape of the perimeter, or edges, of the rectangle or square. The ring 126 connects to the perimeters of the bottom layer 112 and the top layer 114 to form a (substantially gas tight) seal between the bottom layer 112 and the top layer 114.

Figure 7A:
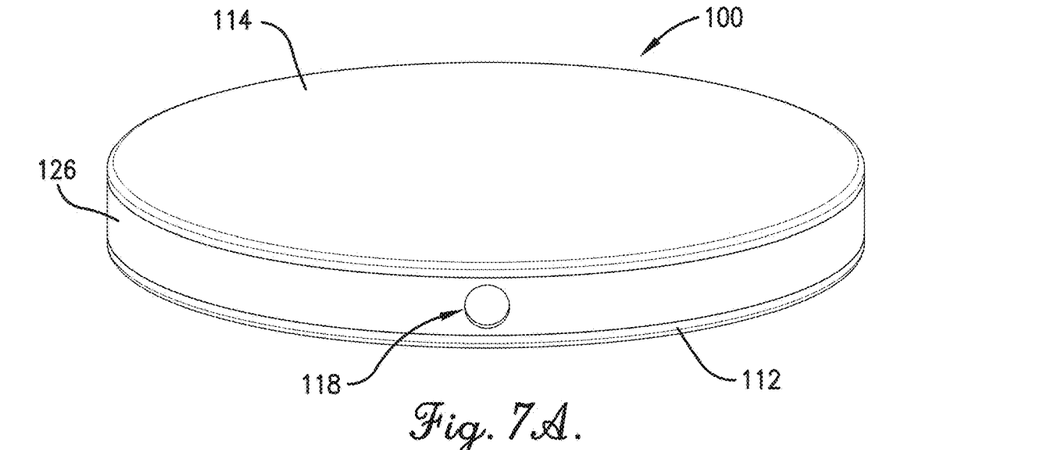
FIG. 7A is an upper perspective view of another embodiment of the collapsible gasket including a vacuum port positioned in a seal between a bottom layer and a top layer.
Figure 7B:
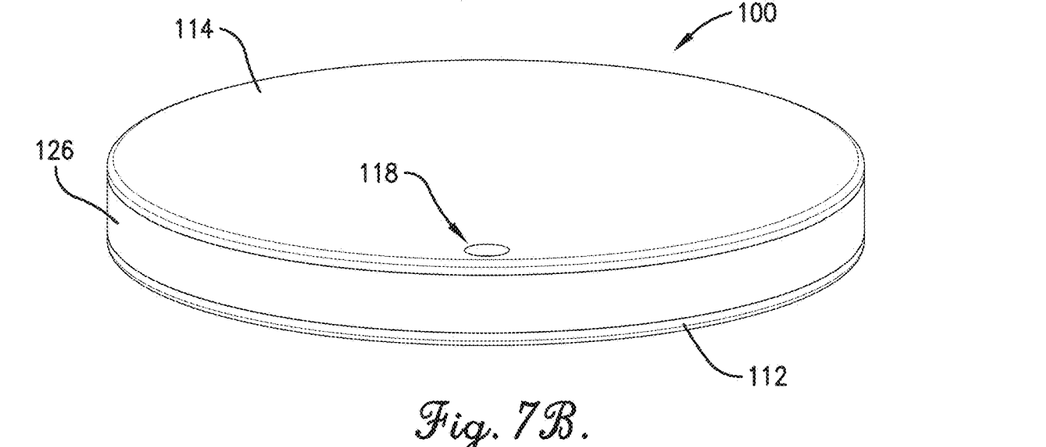
FIG. 7B is an upper perspective view of the other embodiment of the gasket including the vacuum port positioned in the top layer.
Figure 7C:
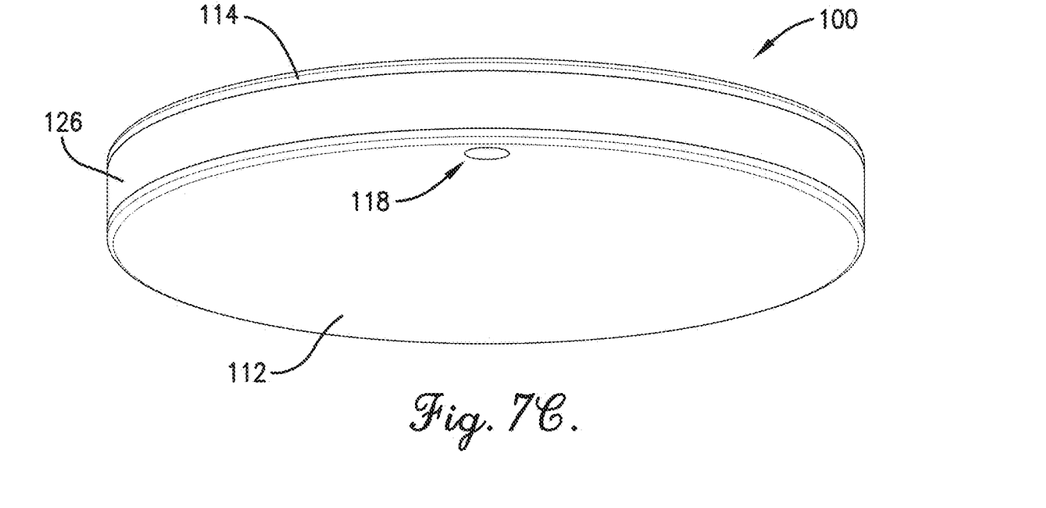
FIG. 7C is a lower perspective view of the other embodiment of the gasket including the vacuum port positioned in the bottom layer.
Figure 8:
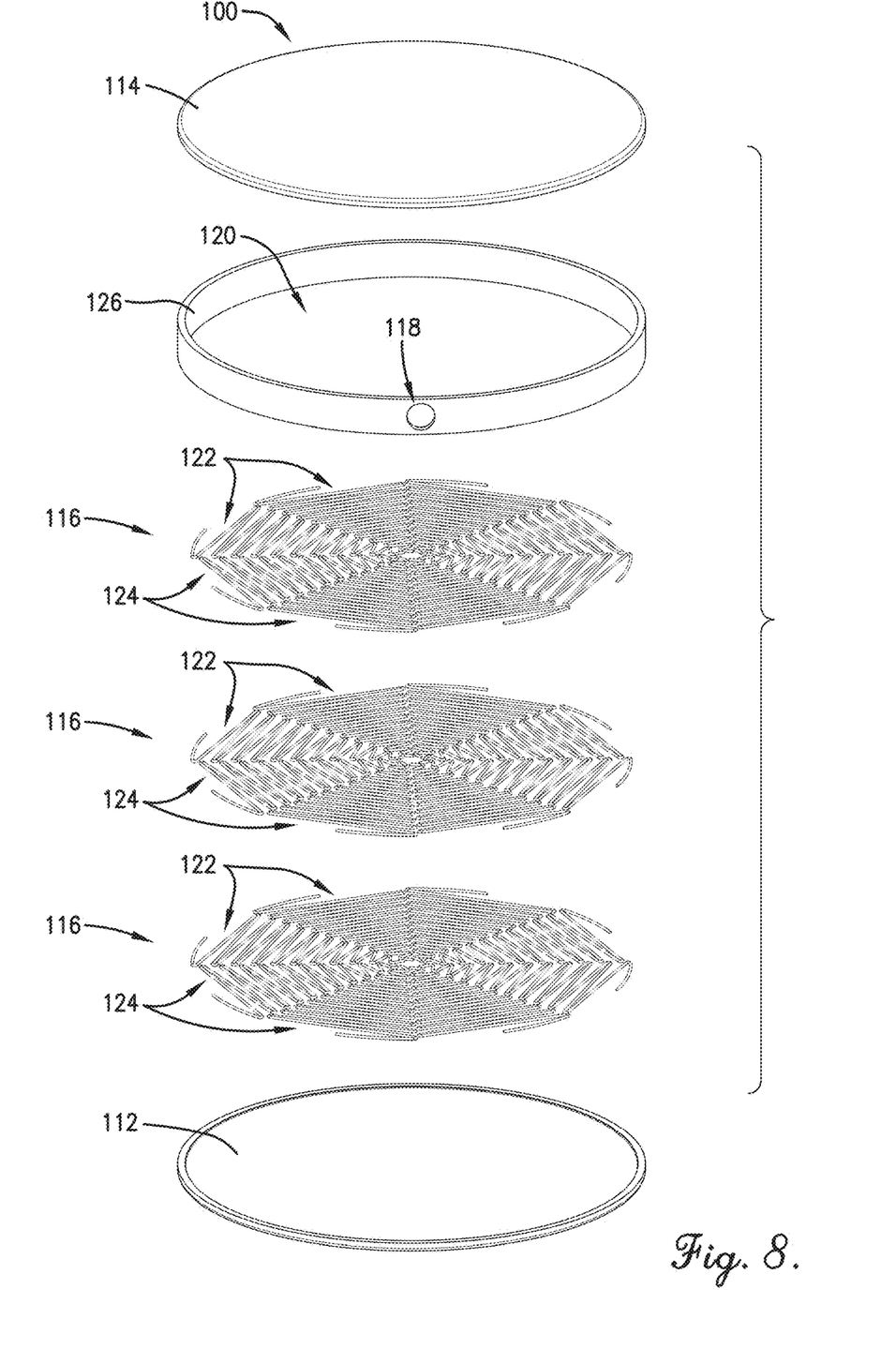
FIG. 8 is an upper perspective exploded view of the other embodiment of the gasket, showing the bottom layer, three intermediate layers, the top layer, and a ring.

Referring to FIG. 7A, the vacuum port 118 may be positioned in the ring 126. Referring to FIG. 7B, the vacuum port 118 may alternatively be positioned in the top layer 114. Referring to FIG. 7C, the vacuum port 118 may alternatively be positioned in the bottom layer 112.

The gasket 100 is utilized in the same manner as the gasket 10 described above.

Figure 9:
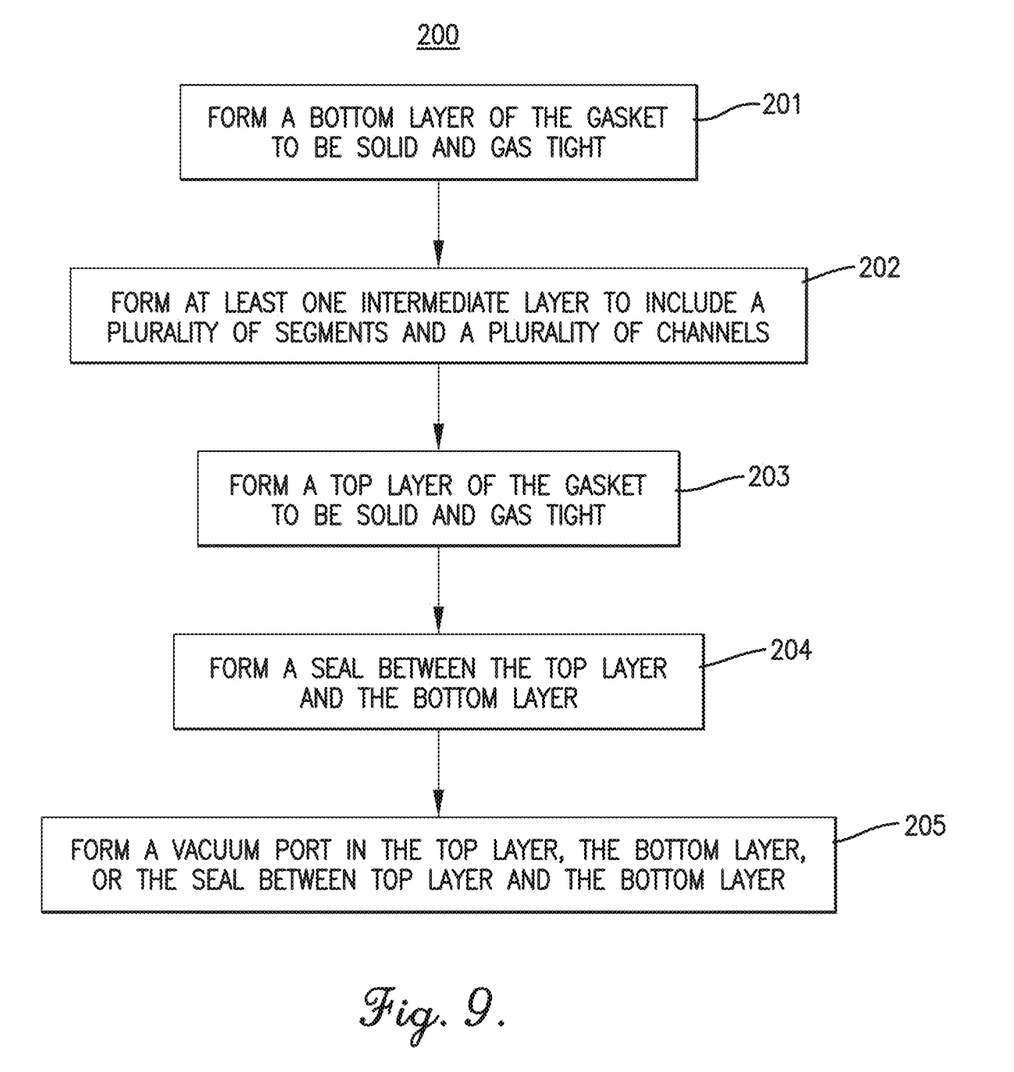
FIG. 9 is a listing of a least a portion of the steps of a method of forming a collapsible gasket.

FIG. 9 depicts a listing of at least a portion of the steps of an exemplary method 200 for fabricating a collapsible gasket 10. Variations to the steps may be performed. The steps may be performed in the order shown in FIG. 9, or they may be performed in a different order. Furthermore, some steps may be performed concurrently as opposed to sequentially. In addition, some steps may be optional or may not be performed.

Referring to step 201, a bottom layer 12, 112 of the gasket 10, 100 is formed to be solid and gas tight. The bottom layer 12, 112 may be formed on a planar surface or on a mold with a non-planar surface. The bottom layer 12, 112, and subsequent layers, are formed from elastomers or other polymers, silicone, or other elastic materials. The layers may also material be formed from materials that are not necessarily elastic, but are flexible and able to be shaped or formed. The bottom layer 12, 112, and subsequent layers, may be formed utilizing direct ink writing (DIW) techniques or other techniques in which a bead of elastic material is deposited on or applied to the surface or mold along a first line. The first line, and subsequent lines, may be straight or may have a curvature or other non-straight features. A second line of material is deposited or applied parallel to the first line such that the material of the second line contacts the material of the first line. Additional lines of material are deposited or applied in the same manner, such that each line of material is in contact with adjacent lines of material. The additional lines of material are deposited or applied until the bottom layer 12, 112 is formed, with the end points of each line of material conforming to the edges or boundaries of the shape of the bottom layer 12, 112.

Referring to step 202, at least one intermediate layer 16, 116 is formed to include a plurality of material segments 22, 122, at least a portion of which are spaced apart and include a plurality of air passage channels 24, 124 therebetween. Some of the segments 22, 122 may be connected to one another. Each segment 22, 122 of the intermediate layer 16, 116 is deposited on or applied to an upper surface of the bottom layer 12, 112 in a pattern that also forms the channels 24, 124 and meets the design requirements. If multiple intermediate layers 16, 116 are included, then each layer is deposited or applied one at a time, with lower layers being deposited or applied before upper layers.

Referring to step 203, a top layer 14, 114 of the gasket 10, 100 is formed to be solid and gas tight. The top layer 14, 114 is deposited on or applied to an upper surface of the uppermost intermediate layer 16, 116. The top layer 14, 114 is formed in the same or similar fashion as the bottom layer 12, 112.

Referring to step 204, a seal between the top layer 14, 114 and the bottom layer 12, 112 is formed. In some embodiments, the perimeter of the top layer 14, 114 is pressed on to the perimeter of the bottom layer 12, 112 and held to create the seal or connection between the layers 14, 114, 12, 112. In other embodiments, a ring 126 forms the seal between the top layer 14, 114 and the bottom layer 12, 112. The ring 126 surrounds the intermediate layer(s) 116 and may be formed by depositing or applying a plurality of beads of elastic/flexible material one on top of another—perhaps using DIW techniques. The sealing of the top layer 14, 114 to the bottom layer 12, 112 may also form an internal chamber 20, 120 bounded by inner surfaces of the top layer 14, 114 and the bottom layer 12, 112.

Referring to step 205, a vacuum port 18, 118 is formed in the top layer 14, 114 (FIGS. 1B, 7B), the bottom layer 12, 112 (FIGS. 1C, 7C), or the seal between the top layer 14, 114 and the bottom layer 12, 112 (FIGS. 1A, 7A). The vacuum port 18, 118 includes an opening from the exterior of the gasket 10, 100 to the internal chamber 20, 120. The vacuum port 18, 118 may be formed by piercing the material at the seal of the top layer 14, 114 and the bottom layer 12, 112 or by placing an insert in between the top layer 14, 114 and the bottom layer 12, 112 before the two layers 12, 112, 14, 114 were sealed to one another. Additional vacuum ports 18, 118 may be formed in the same fashion. The gasket 10, 100 may be cured either before or after the vacuum port 18, 118 is formed.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

The invention claimed is:

1. A collapsible gasket comprising:
   a substantially solid and gas tight bottom layer formed from elastic or flexible material;
   at least one intermediate layer positioned on the bottom layer and formed from elastic material to include a plurality of segments and a plurality of channels, each channel positioned between two or more segments and configured to allow fluid flow through the at least one intermediate layer;
   a substantially solid and gas tight top layer positioned on the at least one intermediate layer and formed from elastic or flexible material, a boundary of a gas tight internal chamber formed by the bottom layer, the top layer, and a seal between the bottom layer and the top layer; and
   a vacuum port positioned in the bottom layer, the top layer, or the seal between the bottom layer and the top layer and configured to allow air to flow from the internal chamber to the exterior of the gasket and vice versa, wherein the collapsible gasket is configured to reduce in height when a vacuum is applied to the vacuum port.

2. The collapsible gasket of claim 1, wherein the seal between the bottom layer and the top layer is formed by a physical connection between a perimeter of the bottom layer and a perimeter of the top layer.

3. The collapsible gasket of claim 1, wherein the seal between the bottom layer and the top layer is formed by a ring positioned between the bottom layer and the top layer and in contact with a perimeter of the bottom layer and a perimeter of the top layer.

4. The collapsible gasket of claim 2, wherein the vacuum port is positioned in the top layer.

5. The collapsible gasket of claim 2, wherein the vacuum port is positioned in the bottom layer.

6. The collapsible gasket of claim 2, wherein the vacuum port is positioned in the seal between the bottom layer and the top layer.

7. The collapsible gasket of claim 3, wherein the vacuum port is positioned in the top layer.

8. The collapsible gasket of claim 3, wherein the vacuum port is positioned in the bottom layer.

9. The collapsible gasket of claim 3, wherein the vacuum port is positioned in the ring between the bottom layer and the top layer.

10. The collapsible gasket of claim 3, wherein the ring has a non-cylindrical shape.

11. The collapsible gasket of claim 1, wherein at least one of the bottom layer and the top layer has a molded shape.

12. The collapsible gasket of claim 1, wherein at least one of the bottom layer and the top layer has a hemispheric shape.

13. The collapsible gasket of claim 1, wherein a portion of the segments within the at least one intermediate layer are formed like webbing in a pattern that is wider at a first end than it is at a second end.

* * * * *